United States Patent
Petty

(10) Patent No.: US 6,389,486 B1
(45) Date of Patent: May 14, 2002

(54) SYSTEMS AND METHODS FOR TRANSFERRING PCMCIA CARD STATUS INFORMATION TO HOST DEVICES

(75) Inventor: John S. Petty, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/305,963

(22) Filed: May 6, 1999

(51) Int. Cl.$^7$ .............................................. G06F 13/00
(52) U.S. Cl. ................. 710/8; 710/2; 710/14; 710/104; 710/300
(58) Field of Search .................. 710/2–14, 260, 710/300–304, 104–106; 360/53; 711/115, 164

(56) References Cited

U.S. PATENT DOCUMENTS

| | | | | |
|---|---|---|---|---|
| 5,572,683 A | * | 11/1996 | Epolite et al. | 710/104 |
| 5,623,637 A | * | 4/1997 | Jones et al. | 711/164 |
| 5,628,028 A | * | 5/1997 | Michelson | 710/8 |
| 5,664,198 A | * | 9/1997 | Chen et al. | 710/260 |
| 5,664,231 A | * | 9/1997 | Postman et al. | 710/73 |
| 5,784,633 A | | 7/1998 | Petty | 710/60 |
| 5,802,558 A | * | 9/1998 | Pierce | 711/115 |
| 5,898,869 A | * | 4/1999 | Anderson | 713/2 |
| 5,978,862 A | * | 11/1999 | Kou et al. | 710/14 |
| 6,029,211 A | * | 2/2000 | Nakashima | 710/14 |
| 6,055,593 A | * | 4/2000 | Shaberman et al. | 710/74 |
| 6,182,204 B1 | * | 1/2001 | Nakashima | 712/38 |
| 6,226,202 B1 | * | 5/2001 | Kikuchi et al. | 365/185.33 |
| 6,256,692 B1 | * | 7/2001 | Yoda et al. | 710/104 |
| 6,266,202 B1 | * | 7/2001 | Nguyen et al. | 360/53 |

FOREIGN PATENT DOCUMENTS

| | | | | |
|---|---|---|---|---|
| JP | 40629004 | * | 10/1994 | G06F/3/08 |
| WO | 9641251 | * | 12/1996 | G06F/1/32 |

* cited by examiner

Primary Examiner—Christopher B. Shin
(74) Attorney, Agent, or Firm—Myers Bigel Sibley & Sajovec

(57) ABSTRACT

Systems and methods of obtaining status information from PCMCIA cards installed within host computers are provided. A PCMCIA card includes a processor having a static random access memory (SRAM) attribute memory address space implemented therewithin. The SRAM attribute memory address space includes a Card Information Structure (CIS) that is readable by the host computer. Owner control signals provide an indication of ownership of the SRAM attribute memory address space. A host computer reads PCMCIA card status information from a CIS when an owner control signal indicates host computer ownership of the SRAM attribute memory address space. A host computer is prevented from reading status information from a CIS when an owner control signal indicates PCMCIA card processor ownership of a SRAM attribute memory address space.

26 Claims, 4 Drawing Sheets

SYSTEMS AND METHODS FOR TRANSFERRING PCMCIA CARD STATUS INFORMATION TO HOST DEVICES

FIELD OF THE INVENTION

The present invention relates generally to PCMCIA cards and, more particularly, to data transmissions between PCMCIA cards and computers hosting PCMCIA cards.

BACKGROUND OF THE INVENTION

Electronic devices, such as computers, may use various peripheral devices to increase flexibility and adaptability to various work environments. This may be especially true for computing devices such as hand-held computer terminals, lap-top computers, and vehicle mounted computing devices. Prior to development of standards for connecting peripheral devices to computers, computers often accepted only limited models and brands of peripheral devices. For example, memory cards often were designed to be plugged only into specific computer models.

A need to standardize the connection of peripheral devices to computing devices was soon recognized, however. Initially, the standardization of interchangeable memory cards was developed. These interchangeable memory cards were sometimes used in lieu of floppy diskettes for exchanging data or for expanding the memory of a computing device. The Personal Computer Memory Card International Association (PCMCIA) was formed by several memory card manufacturers in the late 1980s to define memory card physical design, computer socket design, electrical interface, and associated software (referred to as the PCMCIA interface standard).

Memory cards complying with the PCMCIA interface standard are relatively small, having a length and width roughly the size of a credit card. PCMCIA cards (also referred to as "PC cards") are designed to slide into a receiving slot of a computing device. At one end of a PCMCIA memory card is an interface section which provides a female portion of a connector that mates with a male end in a receiving device.

The success of interchangeable PCMCIA memory cards led to the development of other types of peripheral devices using the PCMCIA interface standard. These peripheral devices include modems, sound cards, floppy disk controllers, hard drives, Global Positioning System (GPS) cards, local area network (LAN) cards, pagers, and radiotelephone cards, among others (hereinafter "PCMCIA cards"). For example, a PCMCIA radiotelephone card may be inserted into the same PCMCIA interface of a computer as other PCMCIA devices.

FIG. 1 illustrates a radiotelephone card 12 connected to a PCMCIA interface 13. The illustrated radiotelephone card 12 is located within a PCMCIA slot 14 of an electronic device 16. As is understood by those skilled in the art, the radiotelephone card 12 functions as a radiotelephone transceiver for transmitting and receiving radiotelephone communications.

For particular PCMCIA cards, such as landline and wireless modems, it may be desirable for a hosting computer to obtain various types of status information during operation thereof. Wireless modem information that can be useful to users may include whether a modem is searching for a channel, whether a modem has found a channel, whether a modem is communicating with a local base station or a desired end point of a connection, the strength of a radio channel, and the state of a modem's battery. Landline modem information that can be useful may include connection speed, whether data is flowing, flow control status, and whether modems in a link are retraining.

Various methods exist for transmitting status information from a PCMCIA card to a device hosting the PCMCIA card. For example, U.S. Pat. No. 5,784,633 to Petty describes using a register set in attribute memory to pass status information to a host device independent of user data. This approach may require the implementation of shadow registers or an equivalent method of creating a dual port random access memory (RAM). Unfortunately, this approach may require a relatively large amount of hardware for each byte of status information to be passed. Furthermore, a dual port RAM may require extensive testing to insure that the RAM behaves correctly during asynchronous accesses from the two ports.

A second approach involves the use of a communication protocol, such as V.80 (defined by the International Telecommunication Union), to multiplex user and status information into a single data stream. This approach may require a specialized low-level software driver at a host device to "de-multiplex" user and status data. Unfortunately, such software drivers are conventionally designed to be operating system-specific. As a result, a separate software driver may be required for multiple host device operating systems.

Accordingly, there is a need for a simplified method of transferring status information from a PCMCIA card to a device hosting PCMCIA cards.

SUMMARY OF THE INVENTION

In view of the above, it is an object of the present invention to facilitate and simplify the transfer of status information from PCMCIA cards to devices hosting PCMCIA cards.

This and other objects of the present invention may be provided by systems and methods of obtaining status information from a PCMCIA card, such as a PCMCIA modem, installed within a PCMCIA interface of a host computer. A PCMCIA card according to the present invention includes a processor having a static random access memory (SRAM) attribute memory address space implemented therewithin. The SRAM attribute memory address space includes a Card Information Structure (CIS) that is readable by the host device.

According to the present invention, an owner control signal, such as a forced data pattern, is transmitted from a PCMCIA card to a computer hosting the PCMCIA card. An owner control signal may be created from a register bit controlled by a PCMCIA card processor. Alternatively, an owner control signal may be created by combining read, write and address lines from a PCMCIA card processor.

An owner control signal according to the present invention provides an indication of ownership of a SRAM attribute memory address space within a PCMCIA card. Accordingly, a host computer can read PCMCIA card status information from a CIS when an owner control signal indicates host device ownership of the SRAM attribute memory address space. A host computer is prevented from reading status information from a CIS when an owner control signal indicates PCMCIA card ownership of a SRAM attribute memory address space.

By providing the owner control signal to the host computer and using the forced data pattern to allow the PCMCIA card to access memory, conflicts between the host and the PCMCIA card accessing the shared address space may be avoided. Thus the attribute memory address space may be updated by the PCMCIA card and read by the host computer to provide PCMCIA information to the host without the complexity of a dual port RAM.

BRIEF DESCRIPTION OF THE DRAWINGS

The accompanying drawings, which are incorporated in and constitute a part of the specification, illustrate an embodiment of the invention and, together with the description, serve to explain principle of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
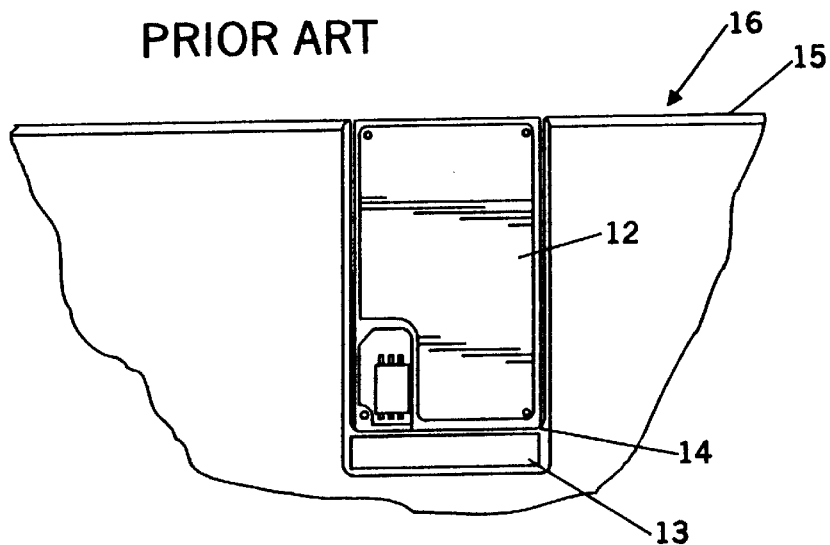
FIG. 1 illustrates a conventional radiotelephone card inserted within a PCMCIA slot of a host device such as a computer.

In FIG. 1, the illustrated PCMCIA radiotelephone card 12 is inserted into a PCMCIA slot 14 located within the housing 15 of an electronic device 16, such as a hand-held or lap-top computing device. As is known to those skilled in the art, within the PCMCIA slot 14 is a PCMCIA interface 13 which has a plurality of pins (not shown) that form a male connector configured to receive a corresponding female connector of a PCMCIA card. As is known to those skilled in the art, the illustrated PCMCIA radiotelephone card 12 has a corresponding plurality of sockets (not shown) which form a female connector configured to receive the corresponding pins of the PCMCIA interface 13.

The PCMCIA interface pins are connected internally and electrically to a data processor within the electronic device 16, as is known by those skilled in the art, by a series of electrical connections, such as wires, printed circuit traces, or electrical ribbon (not shown). The sockets in the radio-telephone card 12 are electrically connected to a radiotelephone transceiver and/or processor in the radiotelephone card 12, as is known to those skilled in the art. When the PCMCIA interface pins engage the sockets of the radiotelephone card 12, electrical signals can be exchanged between the radiotelephone transceiver inside the radiotelephone card 12 and the electronic device 16.

As is known to those skilled in the art, static random access memory (SRAM) is random access memory (RAM) that retains data bits in its memory as long as power is being supplied. Unlike dynamic RAM (DRAM), which stores bits in cells consisting of a capacitor and a transistor, SRAM typically does not have to be periodically refreshed. SRAM typically can provide faster access to data and is often used for cache memory of a computing device. The present invention may be implemented using various types of memory space, including DRAM, and is not limited to SRAM.

Figure 2:
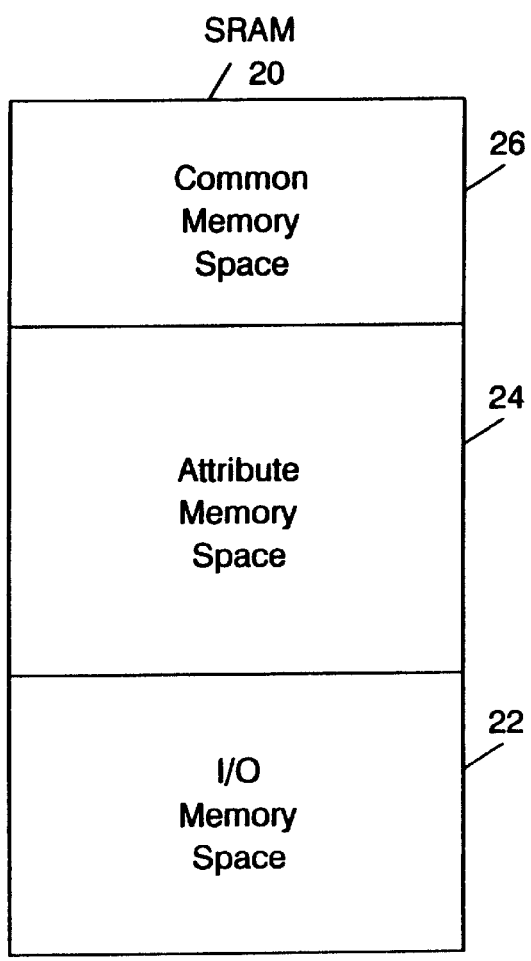
FIG. 2 schematically illustrates a logical separation of memory space within a PCMCIA card into three different spaces: input/output (I/O) Memory Space, Attribute Memory Space, and Common Memory Space.

Referring now to FIG. 2, a memory space 20 within a PCMCIA card processor can be logically separated into three different spaces- input/output (I/O) Memory Space 22, Attribute Memory Space 24 and Common Memory Space 26. I/O memory space 22 can be used by a PCMCIA card to make the PCMCIA card appear as a communications ("com") port to a hosting device. PCMCIA cards are conventionally not required to have an I/O memory space 22.

Common memory 26 is an address space that can be considered by a hosting device to be a block of general purpose memory. Conventionally, local area network (LAN) PCMCIA cards implement common memory 26 to pass relatively large amounts of data between a PCMCIA card and device hosting the PCMCIA card. PCMCIA cards are conventionally not required to have a common memory space 26.

However, attribute memory 24 is conventionally a requirement of the PCMCIA standard. As is known to those skilled in the art, attribute memory 24 is an address space that conventionally contains registers used by a hosting device to set up, control, and monitor a PCMCIA card. Attribute memory also conventionally contains a linked list of data referred to as a "Card Information Structure" (CIS) that a hosting device reads to gain an understanding of the capabilities of a PCMCIA card hosted thereby. For example, a CIS conventionally contains descriptions of a PCMCIA card's functions, a PCMCIA card manufacturer's name, the amount of power needed by a PCMCIA card and various other types of information.

As is known by those skilled in the art, the PCMCIA standard provides for a ready/busy signal to extend between a PCMCIA card and a device hosting the PCMCIA card. A ready/busy signal provides a hosting device with the ability to know whether it can read the CIS of a hosted PCMCIA card. Accordingly, CIS can be implemented inside a PCMCIA card as a single port RAM rather than a more complex and expensive dual port RAM.

Figure 3:
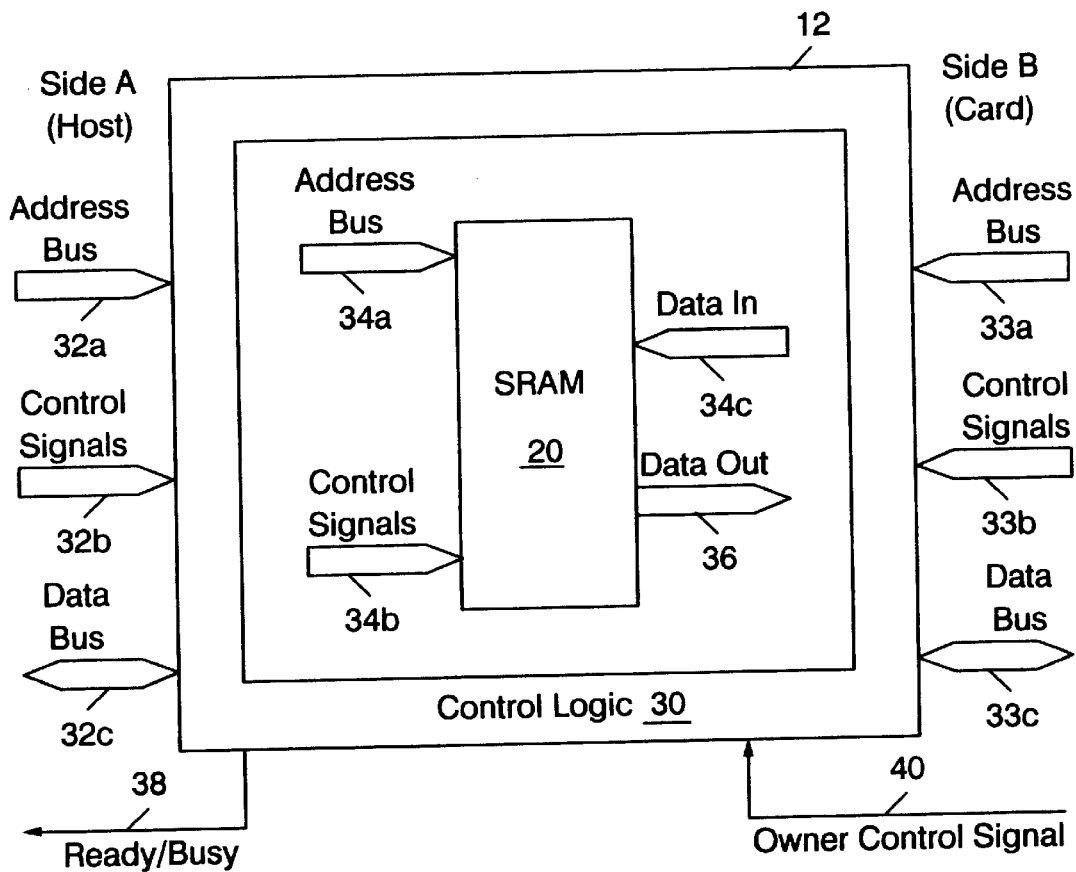
FIG. 3 schematically illustrates a conventional single port SRAM of the type utilized in conventional PCMCIA cards.

Referring now to FIG. 3, a conventional single port memory space 20 of the type utilized in a conventional PCMCIA card 12 is illustrated. The control logic 30 includes an actual address bus 32a, data bus 32c, and bus control signals 32b for the host side and an actual address bus 33a, data bus 33c, and bus control signals 33b for the card side, as illustrated. The switches that connect the memory space 20 to either side A or side B are inside the control logic 30 and are controlled by the owner control signal 40. Illustrated switches include those that connect the various memory space inputs 34a, 34b, 34c and outputs 36 to either Side A (hosting device side) or Side B (PCMCIA card side), but never both together. The illustrated Ready/Busy line 38 is configured to show "busy" after a reset. This means that a hosting device is not allowed to access the memory space 20 and, accordingly, the PCMCIA card side (Side B) has complete control of the memory space 20.

A processor (not shown) in the PCMCIA card 12 loads the CIS into the memory space 20 and, after the load is finished, uses an Owner Control Signal 40 to set the Ready/Busy line 38 to "ready." At this point, a hosting device can read the CIS and the PCMCIA card side (Side B) is not allowed to modify the CIS. In normal operation, the PCMCIA card side (Side B) does not have access to the memory space 20 until after the next reset, at which point the entire process of loading the CIS is repeated. Thus, the memory space 20, or any other form of memory used to store the CIS, has only one "owner" at a time as it switches between being owned by a hosting device or by a PCMCIA card. Accordingly, the PCMCIA standard typically prohibits using the Ready/Busy line 38 as a delay mechanism during normal operation.

To transfer status information from a PCMCIA card to a device hosting the PCMCIA card, the PCMCIA standard conventionally requires that an attribute memory (24, FIG. 2) be implemented to hold a CIS that can be read by the hosting device at "power-on" time, but not thereafter. As a result, memory space attribute memory 24 is conventionally idle after a hosting device has read the CIS for a PCMCIA card.

According to the present invention, a single port memory space attribute memory 24 can be utilized as a transport mechanism for transferring PCMCIA card status information from a PCMCIA card to a hosting device. The present invention provides a way for a hosting device to know when it does and does not own memory space at times other than the brief period of time after a PCMCIA card reset. This is accomplished by using a forced data pattern to signal a hosting device when the hosting device does not own memory space attribute memory 24 of a PCMCIA card (i.e., a "memory space not available" data pattern).

Figure 4:
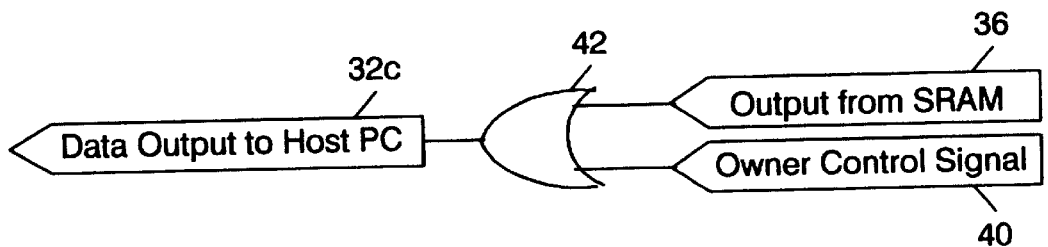
FIG. 4 schematically illustrates the addition of a two-input gate to each hosting device data bus line, according to the present invention.

According to an embodiment of the present invention illustrated in FIG. 4, a two-input gate 42 is added to each hosting device data bus line 32c. In addition, a single register bit (not illustrated) may be added to the memory space of a PCMCIA card processor. The owner control signal 40 is common for all new two-input gates 42. When the owner control signal 40 is low, a hosting device receives data from a PCMCIA card memory space in a conventional manner. When the owner control signal 40 is high, the output of gate 42 is high irrespective of the output from memory space 36 and a hosting device receives only high values for the output from the memory space when an attempt is made to read the PCMCIA card memory space. These high values will be recognized by the hosting device as indicating that the memory space is not available. It is understood that "AND" gates rather than "OR" gates, or even a combination of "AND" gates and "OR" gates, may be utilized in accordance with the present invention to create a "memory space not available" data pattern.

Figure 5:
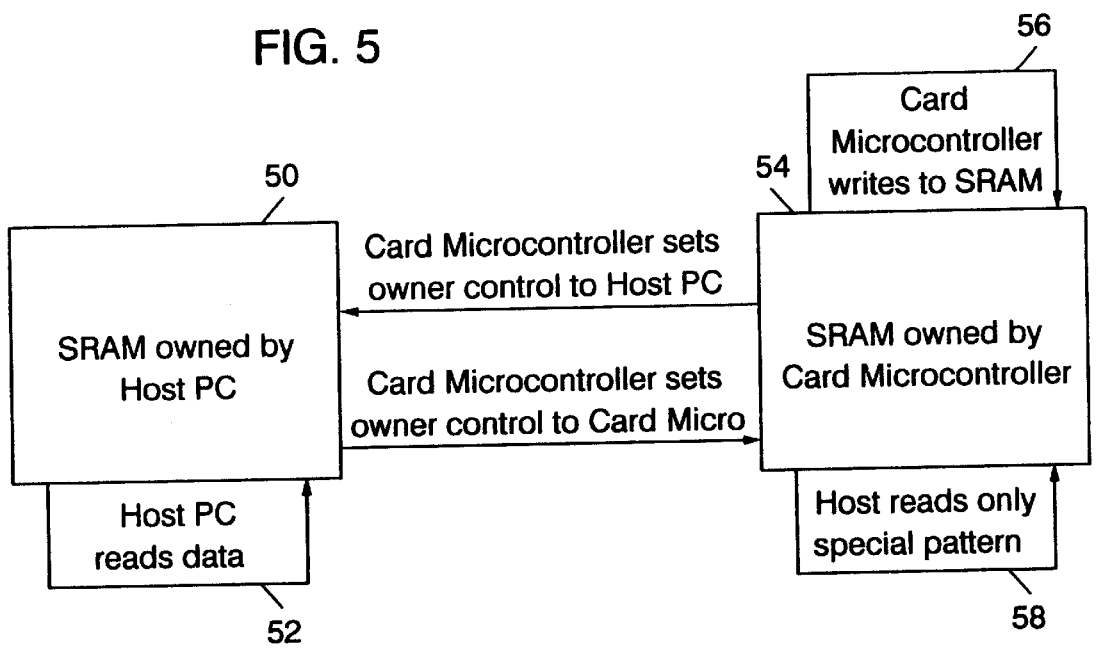
FIG. 5 is a state diagram that illustrates implementation of an owner control signal according to the present invention.

Referring now to FIG. 5, a state diagram illustrates implementation of an owner control signal 40 according to an embodiment of the present invention. As illustrated, when a PCMCIA card memory space is owned by a hosting device 50 (i.e., the PCMCIA processor sets owner control to the hosting device), the hosting device can read status information from the PCMCIA card 52. When a PCMCIA card memory space is owned by the PCMCIA card processor 54 (i.e., the PCMCIA processor sets owner control to the PCMCIA card processor), the PCMCIA card processor accesses the PCMCIA card memory space 56 and the hosting device reads only the special data pattern of the owner control signal 58 (i.e., "memory space not available" data pattern).

An owner control signal 40 can be created from a register bit controlled by a PCMCIA card processor so that software in the processor could start or stop delivery of a "memory space not available" data pattern to a hosting device. Thus, the owner control signal could be generated based on the state of the register bit.

Figure 6:
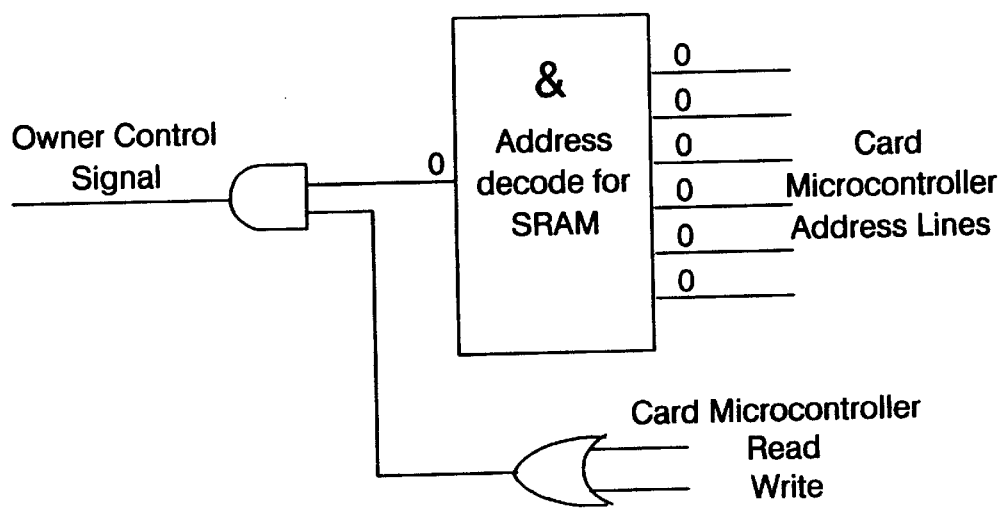
FIG. 6 illustrates an alternative way of creating an owner control signal according to the present invention wherein read, write and address lines from a PCMCIA card processor are combined so that an owner control signal becomes active automatically while a PCMCIA card processor reads or writes to a SRAM.

Alternatively, an owner control signal 40 can be created by combining read, write and address lines from a PCMCIA card processor so that an owner control signal 40 becomes active automatically while a PCMCIA card processor reads or writes a memory space, as illustrated in FIG. 6. According to this alternative embodiment, a hosting device can read a word from a PCMCIA card memory space between write operations to the PCMCIA card memory space by the PCMCIA card processor.

The alternative implementation illustrated in FIG. 6 does not require card microcontroller software. In FIG. 6, every time the card microcontroller writes status information to the CIS memory, the hardware detects that and generates the owner control signal. For this and all implementations, the owner control signal forces the data output to the host PC to the "data not available" pattern (as shown in FIG. 4), if the host PC does a read while the owner control signal is in the "card owns" state.

Preferably, a program in a hosting device that is configured to read status information from a PCMCIA card is also configured to detect a "memory space not available" data pattern and to respond appropriately. Preferably, legitimate status information from a PCMCIA card does not contain a "memory space not available" data pattern. For example, three types of status information for a PCMCIA wireless modem may include signal strength (having a range of 0 to 10), channel number (having a range of 1 to 500), and whether the PCMCIA wireless modem is scanning for a channel. If the "memory space not available" data pattern is X'00', signal strength can be shifted to a range of 1 to 11 for passage through memory space attribute memory (24, FIG. 2). Channels 1 to 255 can be represented as themselves and channels 256 to 500 can be incremented by 1. Similarly, the values 1 and 2 can be used to indicate whether the PCMCIA card is scanning for a channel. When a status program in a hosting device collects PCMCIA card status information, it reads the desired four addresses and subtracts the value 1 from what it reads as needed. If a status program reads a value of X'00', it discards the previous byte read because there may not be synchronization between the hosting device and the PCMCIA card processor.

Also, if the rate at which the PCMCIA card updates status information is known (e.g., 1 update per second), the hosting device status program can use the time at which it reads an X'00' from the PCMCIA card to synchronize its reads to half-way between the PCMCIA card processor writes. For example, if the rate at which the PCMCIA card updates status information is 1 update per second, the status program can be configured to delay its next read by 0.5 seconds and then read at 1 second intervals thereafter.

Figure 7:
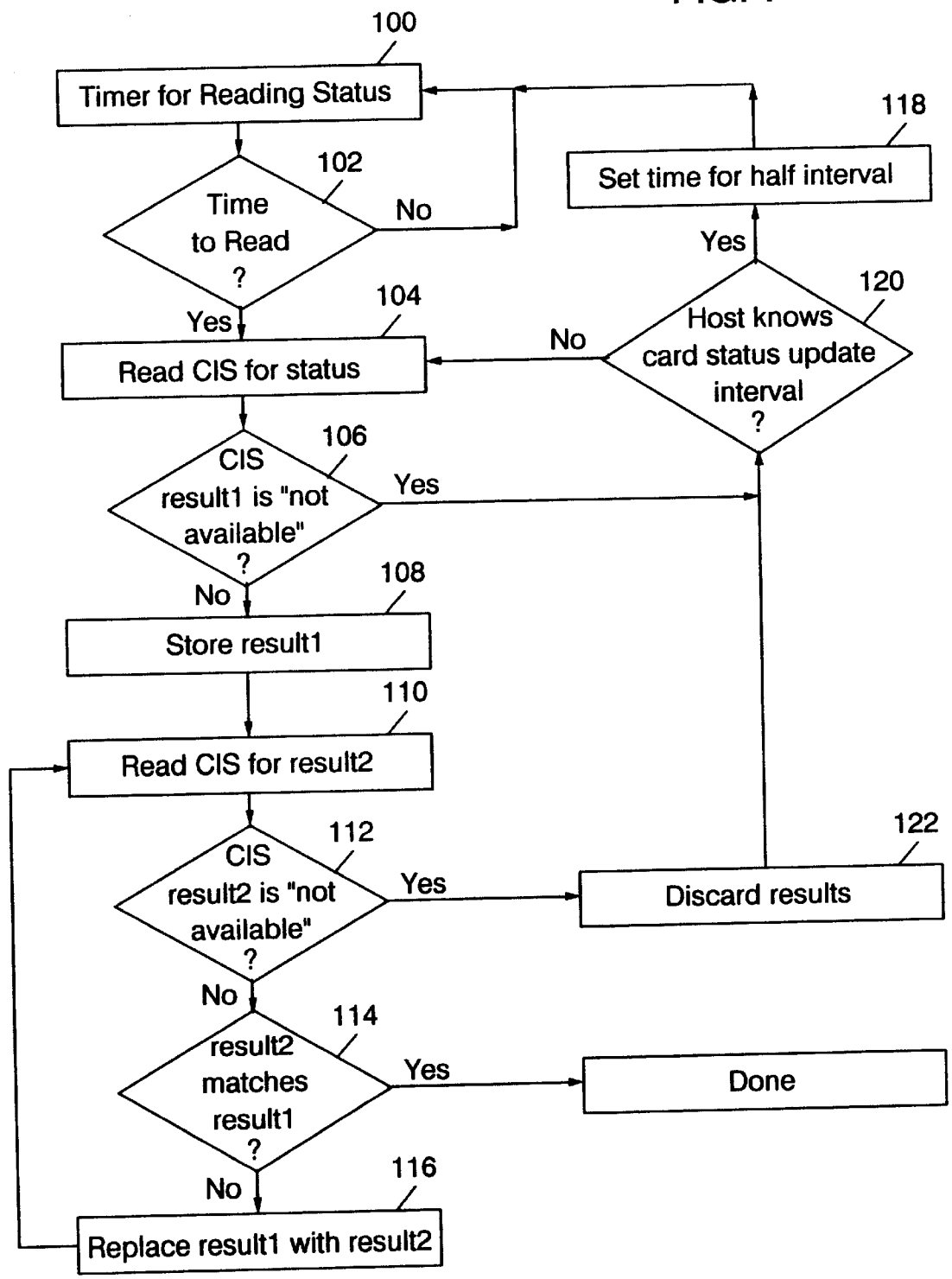
FIG. 7 schematically illustrates the way a host computer obtains status information from a PCMCIA card (PC card) equipped with the present invention.

FIG. 7 schematically illustrates the way a host computer obtains status information from a PCMCIA card (PC card) equipped with the present invention. FIG. 7 applies to each byte (if the PCMCIA card uses an 8 bit data bus) or word (16 bit data bus) of status information to be obtained from the PCMCIA card. When the host wants to get a valid byte/word of data, it reads the appropriate address (Block 104). If the result is the "data not available" pattern (Block 106), the host PC knows the card microcontroller has control of the CIS memory. For any other read result, the host computer stores result1 as potentially valid status data (Block 108). However, if the read happens to occur during the very small window while the PCMCIA card's microcontroller is taking or relinquishing control of the CIS memory, the data might be invalid. So, the host reads the same address a second time (Block 110). If the second read attempt agrees with the first (Block 114), the data is valid (because the window for invalid data is much shorter than the interval between host reads so there is no possibility of two consecutive reads of a location producing the same invalid data) and the host knows it has successfully read some status data. If the second read is the "data not available" pattern (Block 112), the host knows the card's microcontroller has taken control of the RAM so the host discards the first data it read and starts over (Block 122). Note that if the host knows or has learned the update interval used by the card (Block 120), it should wait half that interval before attempting another read. If the data from the second read matches neither the "data not available" value nor the data from the first read, then the host discards the data from the first read, replaces it with this new value (Block 116), and tries again for a match (Block 110). On the second try of the second read, the host always either gets a duplicate result (meaning the data is valid) or it gets the "data not available" pattern. The host computer repeats the process of FIG. 7 for each address location that contains status information.

The PCMCIA card microcontroller takes control of the CIS memory at asynchronous times (from the point of view of the host). Without the "not available" hardware, the host reads are undefined and it is very possible the host could read the same garbage data twice some of the time.

Note that one status address location should contain the status update rate used by a PCMCIA card (i.e., the time period during which the host computer owns the memory). Once the host correctly reads that information, it can synchronize itself to the PCMCIA card's timing so that it almost never reads the "data not available" value.

Alternatively, to simplify the host software, the synchronization timer and the top three blocks (Blocks 100, 102 and 118) in FIG. 7 can be removed in return for always reading each status location twice to be certain the data is valid.

The present invention is not limited to transferring status information from PCMCIA cards to hosting devices. Information transfer between various devices, such as between low and high-speed processors, may be accomplished via the present invention.

EXAMPLE

Assume a host read cycle is 500 nano seconds (nsec) and a PCMCIA card processor's write cycle is 100 nsec and that there are 100 address locations of status information. Since the status information is primarily for human use, the status update rate can be relatively slow. For a 1 second interval, it will take the host processor somewhat longer than 100 microseconds to read all of the status locations twice assuming the host processor is relatively fast at fetching and executing its own instructions. It will take the PCMCIA card microcontroller approximately the same length of time to write all of the status locations once and the register bit that sets the owner control signal twice, because mixed in with the writes of status information the card microcontroller must fetch its own instructions at 100 nsec per read.

100 microseconds is 0.0001 of 1 second which means it is an insignificant portion of the overall 1 second window. This means once the host has detected card ownership of the CIS and waited 0.5 second to retry, the number of time intervals the host can use a single read to get known good status information is determined by the relative accuracy of the host and card clocks. If the two clocks differ by 1%, the host could do 49 'single try' reads before switching back to the 'double read' approach of FIG. 7.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of obtaining status information from a peripheral device card installed within a peripheral device interface of a host device, wherein the peripheral device card includes a processor having a static random access memory (SRAM) attribute memory address space implemented therewithin, and wherein the SRAM attribute memory address space comprises a Card Information Structure (CIS) that is readable by the host device, the method comprising the steps of:

transmitting an owner control signal from the peripheral device card to the host device, wherein the owner control signal provides a first indicium when the SRAM attribute memory address space is owned by the peripheral device card and a second indicium when the SRAM attribute memory address space is owned by the host device; and reading, via the host device, peripheral device card status information from the CIS when the owner control signal indicates host device ownership of the SRAM attribute memory address space.

2. A method according to claim 1 wherein the step of transmitting an owner control signal from the peripheral device card to the host device comprises transmitting a forced data pattern from the peripheral device card to the host device.

3. A method according to claim 1 further comprising the step of preventing status information from being read from the CIS by the host device when the owner control signal indicates peripheral device card processor ownership of the SRAM attribute memory address space.

4. A method according to claim 1 wherein the owner control signal is created from a register bit controlled by the peripheral device card processor.

5. A method according to claim 1 wherein the owner control signal is created by combining read, write and address lines from the peripheral device card processor.

6. A method according to claim 1 wherein the peripheral device card comprises a modem selected from the group consisting of wireless modems and landline modems.

7. A method according to claim 1 wherein the host device comprises a data processor.

8. A method according to claim 1 wherein the peripheral device interface is a PCMCIA interface and wherein the peripheral device card is a PCMCIA card.

9. A system for obtaining status information from a peripheral device card installed within a peripheral device interface of a host device, wherein the peripheral device card includes a processor having a static random access memory (SRAM) attribute memory address space implemented therewithin, and wherein the SRAM attribute memory address space comprises a Card Information Structure (CIS) that is readable by the host device, comprising:

means for transmitting an owner control signal from the peripheral device card to the host device, wherein the owner control signal provides a first indicium when the SRAM attribute memory address space is owned by the peripheral device card and a second indicium when the SRAM attribute memory address space is owned by the host device; and means for reading, via the host device, peripheral device card status information from the CIS when the owner control signal indicates host device ownership of the SRAM attribute memory address space.

10. A system according to claim 9 wherein the means for transmitting an owner control signal from the peripheral device card to the host device comprises means for transmitting a forced data pattern from the peripheral device card to the host device.

11. A system according to claim 10 wherein the means for transmitting an owner control signal from the peripheral device card to the host device comprises a two-input gate added to at least one data bus line of the host device.

12. A system according to claim 9 further comprising means for preventing status information from being read from the CIS by the host device when the owner control signal indicates peripheral device card processor ownership of the SRAM attribute memory address space.

13. A system according to claim 9 wherein the owner control signal is created from a register bit controlled by the peripheral device card processor.

14. A system according to claim 9 wherein the owner control signal is created by combining read, write and address lines from the peripheral device card processor.

15. A system according to claim 9 wherein the peripheral device card comprises a modem selected from the group consisting of wireless modems and landline modems.

16. A system according to claim 9 wherein the host device comprises a data processor.

17. A system according to claim 9 wherein the peripheral device interface is a PCMCIA interface and wherein the peripheral device card is a PCMCIA card.

18. An electronic device, comprising:

a peripheral device card interface;

a peripheral device card installed within the peripheral device card interface, wherein the peripheral device card includes a processor having a static random access memory (SRAM) attribute memory address space implemented therewithin, and wherein the SRAM attribute memory address space comprises a Card Information Structure (CIS) that is readable by the electronic device;

means for transmitting an owner control signal from the peripheral device card to the electronic device, wherein the owner control signal provides a first indicium when the SRAM attribute memory address space is owned by the peripheral device card and a second indicium when the SRAM attribute memory address space is owned by the electronic device; and means for reading peripheral device card status information from the CIS when the owner control signal indicates electronic device ownership of the SRAM attribute memory address space.

19. An electronic device according to claim 18 wherein the means for transmitting an owner control signal from the peripheral device card to the electronic device comprises means for transmitting a forced data pattern from the peripheral device card to the electronic device.

20. An electronic device according to claim 19 wherein the means for transmitting an owner control signal from the peripheral device card to the electronic device comprises a two-input gate added to at least one data bus line of the electronic device.

21. An electronic device according to claim 18 further comprising means for preventing status information from being read from the CIS by the electronic device when the owner control signal indicates peripheral device card processor ownership of the SRAM attribute memory address space.

22. An electronic device according to claim 18 wherein the owner control signal is created from a register bit controlled by the peripheral device card processor.

23. An electronic device according to claim 18 wherein the owner control signal is created combining read, write and address lines from the peripheral device card processor.

24. An electronic device according to claim 18 wherein the peripheral device card comprises a modem selected from the group consisting of wireless modems and landline modems.

25. An electronic device according to claim 18 wherein the electronic device comprises a data processor.

26. An electronic device according to claim 18 wherein the peripheral device interface is a PCMCIA interface and wherein said peripheral device card is a PCMCIA card.

* * * * *